United States Patent [19]

Tureck et al.

[11] 4,303,307
[45] Dec. 1, 1981

[54] COPY SECURITY SYSTEM

[76] Inventors: Al Tureck, 3728 West Enfield, Skokie, Ill. 60076; Theodore P. Gordon, 555 Cornelia, Chicago, Ill. 60657

[21] Appl. No.: 87,667

[22] Filed: Oct. 24, 1979

Related U.S. Application Data

[63] Continuation-in-part of Ser. No. 845,851, Oct. 27, 1977, abandoned.

[51] Int. Cl.³ .................. G02B 27/00; B42D 15/00
[52] U.S. Cl. .................. 350/276 R; 283/8 R; 283/8A; 356/256; 428/916
[58] Field of Search ............ 356/256; 350/276 R; 283/8 R, 8 A; 428/916

[56] References Cited

U.S. PATENT DOCUMENTS 3,154,872  11/1964  Nordgren ........................ 350/105
3,887,742  6/1975  Reinnagel ........................ 428/916
4,082,426  4/1978  Brown ........................... 350/105

OTHER PUBLICATIONS

Dobrowolski et al., "Optical Interference Coatings for Inhibiting of Counterfeiting", Optical Acta, 12–1973, pp. 925–937.
Born et al., "Principles of Optics", Pergamon Press, 1975, pp. 652–664

Primary Examiner—William H. Punter
Attorney, Agent, or Firm—George H. Gerstman

[57] ABSTRACT

A security system to prevent the unauthorized duplication of documents on standard electrostatic copiers. Paper substrates are coated with layers of carefully sized and spaced beads which break up the light emitted by a copier to a degree sufficient to preclude copying. In another embodiment, an original consisting of a paper substrate bonded to a reflective metalized film reflects light from the copier, and masks the image of any intelligence present on the substrate.

4 Claims, 4 Drawing Figures

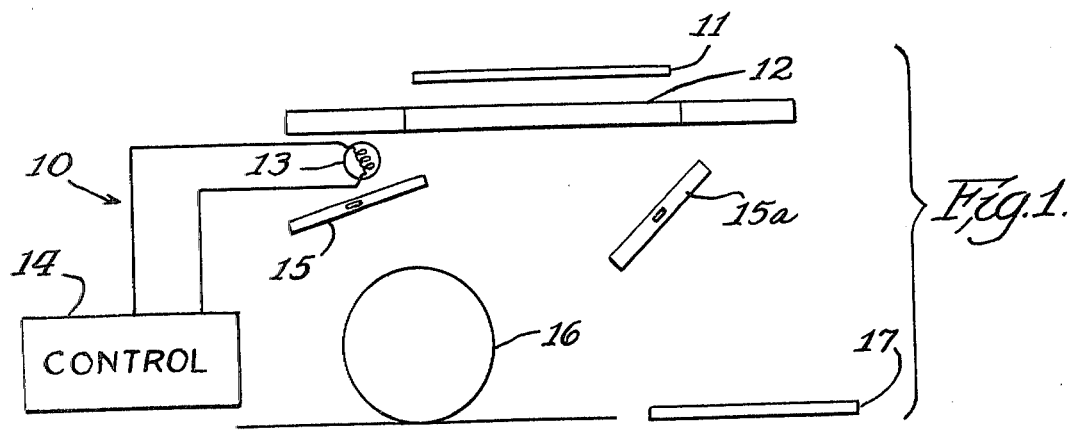
Fig. 1.
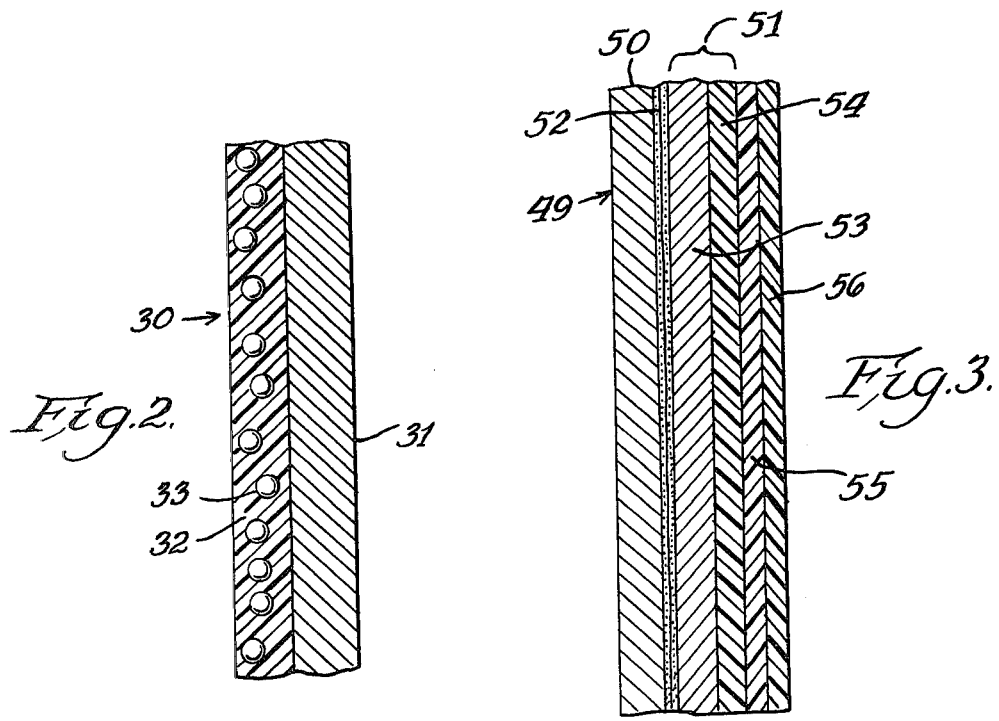
Fig. 2.
Fig. 3.
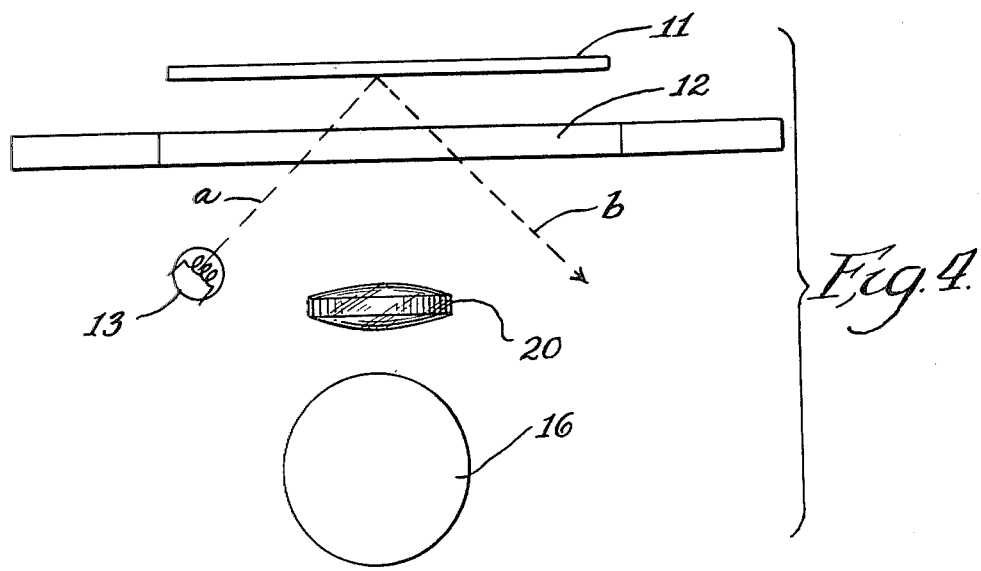
Fig. 4.

COPY SECURITY SYSTEM

BACKGROUND OF THE INVENTION

This application is a continuation-in-part of application Ser. No. 845,851, filed Oct. 27, 1977, now abandoned.

This invention relates to copy security systems and, more particularly, to methods and apparatus to prevent the unauthorized copying or removal of documents from a protected area.

Proliferation of electrostatic copiers and increased public awareness and access to such copiers has made it all but impossible to prevent indiscriminate copying of documentary material. One very obvious consequence of such a situation is to make it virtually impossible to protect the confidentiality or secrecy of documents when a photocopier is close at hand. This affects not only top secret government and industrial documents, but also limits the ability of, for example, an author to limit circulation or distribution of his works. Another problem becoming increasingly more prevalent is that of counterfeiting, particularly where color copiers are involved. Currency, receipts, checks and other commonly distinctively colored documents may be reproduced in authentic enough detail to pass for originals. Even in situations where no fraud or crime is involved, it is often necessary to distinguish an original document from copies made thereof.

Past efforts at assuring document security have, for the most part, centered upon physically limiting access to the photocopier itself. Systems requiring special keys or identification cards to operate the copier are in common use. This system's most obvious weakness is that it is no more effective than the integrity and honesty of the card or key-holder. Such a system may also be easily defeated by duplication or theft of the card or key.

Prior art attempts at solution of the foregoing problems have often required alterations to the operating circuitry of an office copier. Devices such as those described in U.S. Nos. 3,831,007 and 3,977,785 require the originals to be reproduced on paper having a coded portion which may be detected by sensors within the copying machine mechanism. When the copying machine thus detects the presence of such coded sections, the copier is disabled and cannot copy the document involved. Such devices are subject to many potential shortcomings, including the addition of sensitive, complex circuitry to an already complex machine, from which greater maintenance and upkeep costs may be safely predicted. To defeat such a system would require simply removing the document to a copier not so equipped or, equipped with a differently functioning security system, then copying the document thereon. Another approach to the problem is typified in U.S. Pat. Nos. 3,807,852 and 3,887,742 utilizing documents having specifically dyed or colored portions which do not reproduce well on certain types of copying equipment. Again, such a system is limited in usefulness to copying equipment of limited operating specifications. The most important consideration here is selection of that portion of the electromagnetic spectrum within which an individual copier may successfully operate, and selecting a color or colors which will appear black or featureless when copied.

Often, within a document security system, differing levels of security are required for different classes of documents. Thus, in a relatively low-security setting, it may become necessary to provide security measures which provide a minimum of operator inconvenience but which will be consistent with other, more stringent security measures required in different portions of the same building or department. When all that is required is to provide a level of security making it inconvenient for documents to be copied, it is extremely inefficient to adopt a system of security which could best be utilized in circumstances of extreme national security. On the other hand, security is severely jeopardized where the transportation of a document from one department to the next represents the difference between successfully copying the document or not.

Another problem is encountered when it becomes desirable or necessary to allow reproduction of selected portions of a document while blocking reproduction of other portions. Such a selective control system must allow application of the controlling substance to that portion of the original intended to be protected.

Documents used for personal identification are more reliable when non-reproducible and non-alterable. Perfection of identification documents meeting these criteria would mean other, more sophisticated, more time-consuming, and more expensive identification systems would not be required, as, for example, the checking of photographs, fingerprints or signatures with a central master file.

Document security should also extend to documents which, at the time of their preparation, may not have had security ramifications, but which subsequently warrant protection. In such a situation, the document should be protectible even though it has not been printed as an original on specially prepared paper stock.

Often it becomes important to be able to distinguish an original document from a counterfeit or copy. A document security system making at least a portion of an original non-reproducible or selectively detectable provides a readily distinguishing characteristic. This would aid in such cases as attempted reproduction of currency or negotiable bonds on electrostatic copiers.

Document security systems may be applied to the original, or, if required, to the paper or web stock used by the individual electrostatic copier. In situations where the copies produced of an original must, in themselves, be protected, use of a specially modified paper within the copier may be required. Such paper should, of course, meet the specifications and tolerances of the individual copier with which it is intended to be used.

Accordingly, the present invention has the following objects:

To provide security systems for documents capable of effectively controlling reproduction of said documents by electrostatic copiers;

To provide such security systems in forms not dependent for their efficacy on special modifications of existing copiers;

To provide such systems enabling creation of various levels or hierarchies of security while maintaining consistency from level to level;

To provide such systems in forms utilizable to distinguish copy from a copied original;

To provide such systems for the production of non-reproducable and non-counterfeitable personal identification documents;

To provide such systems pre-formed and pre-positioned within a web material suitable for document printing and reproduction;

To provide such document material in forms readily utilizable in standard electrostatic copiers; and To provide such systems in forms protecting not only originals, but copies made of originals from unauthorized duplication.

These and further objects will become more apparent upon a description of the invention and consideration of the accompanying drawings.

BRIEF DESCRIPTION OF THE INVENTION

In accordance with the present invention, a copy-resistant document is provided for precluding the unauthorized copying of the document on copying apparatus having light-producing elements and receiving elements for receiving light reflected from the document. The document comprises means for diverting the transmission of the reflected light away from the receiving elements.

In one illustrative embodiment of the invention, the document includes a supporting substrate including a dielectric layer formed of an electrically non-conducting material. A plurality of generally spherical particles are formed of an electrically conducting material and are embedded within the dielectric layer. The particles are operable to forwardly scatter the light and divert the transmission of substantially all of the reflected light away from the receiving elements.

In another embodiment of the invention, the copy-resistant document comprises means for diverting the transmission of all of the reflected light away from the receiving elements, with the light diverting means comprising a layer of metalized film, operable to cause specular reflection of the light.

A more detailed explanation of the invention is provided in the following description and claims, and is illustrated in the accompanying drawings.

BRIEF DESCRIPTION OF THE DRAWINGS

FIG. 1 is a partial schematic illustrating several electrostatic copier components;

FIG. 2 is a partial side sectional view of a copy-resistant document utilizing conductive spheres;

FIG. 3 is a partial side sectional view of a copy-resistant document utilizing laminated metalized film; and FIG. 4 is a partial schematic illustrating specular reflection principles in accordance with the present invention.

DETAILED DESCRIPTION OF THE ILLUSTRATIVE EMBODIMENTS

Referring now to FIG. 1, the numeral 10 indicates generally a partial schematic drawing illustrating the basic functioning mechanism of an electrostatic copier. Typically, an original 11 to be copied is first positioned on a transparent platen 12 which may be formed of glass, or a similar transparent medium. After original 11 has been so positioned, operation of copier 10 is initiated, illuminating original 11 with lamp 13 in a sequence which may be unique to each such copier, the operation of which is determined by circuitry herein illustrated schematically and generally as control 14. A typical electrostatic reproduction requires light incident on original 11 to be reflected via mirrors 15 and 15a to drum 16, upon which a latent electrostatic image is thus maintained. The copier herein illustrated utilizes a lamp 13 which travels the length of platen 12 during the copy cycle, and mirrors 15 and 15a which may pivot in sequence with said travel. Copiers with fixed illuminating elements and/or fixed mirrors are, however, intended to be included within the following descriptions. The image so produced is subsequently transferred to a paper web segment 17 and hardened by the application of heat. Web segment 17 thus becomes a photocopy of original 11.

Operation of copier 10 may be selectively controlled by, for example, modification of control 14 requiring a user to furnish a key to unlock access to the machine's control circuits. Such a system might require extensive rewiring of the photocopier involved, and would not prevent a user from simply taking the original to another, non-key equipped copier for duplication.

In a preferred embodiment of the present invention, control of photo duplication is accomplished by interrupting or frustrating the production of a reflected latent image of original 11 to drum 16. In this manner, the copier becomes functionally "blind" to the information reproduced on original 11. What the copier cannot "see", it cannot reproduce.

Referring to FIG. 4, the copier drum 16 is made "blind" to the information reproduced on original 11 by rendering original document 11 copy-resistant in a manner that provides specular reflection. Thus when the light from lamp 13 impinges (via mirror reflection or otherwise) on original document 11, the lgiht will be reflected away from the document at an angle equal to the angle of incidence on the document. As illustrated in FIG. 4 wherein the light from lamp 13 is directed to original document 11 by path a and is reflected via path b, the light reflected from document 11 via path b is diverted away from lens 20. In this manner, all of the reflected light is directed away from the receiving elements of the copier and the copier is rendered "blind" to the information reproduced on original document 11.

One method for disrupting the transmission of indicia from an original document to the drum of an electrostatic copier utilizes a well-known, naturally occurring optical phenomenon involving the scattering of incident light by small particles. Controlling the size, shape, pattern of dispersion, and composition of the particles allows the scattering and absorption effects to be regulated.

As described hereinabove, electrostatic copiers operate by illuminating the document to be copied, transmitting the light from the document, via reflection or otherwise, to a drum or other light receiving elements upon which an electrostatic image is developed. The resulting image is thereafter transferred to a paper web and thus forms the completed copy. This sequence of copying steps may be successfully disrupted if the light, as reflected from the original document, is so dispersed as to effectively prevent the transmission of a focused, reflected image to the copier drum. Such a disruption may be accomplished by use of a copy-resistant document 30 formed as illustrated in FIG. 2, of a lower supporting substrate 31 upon which is formed a layer 32 which, in a preferred embodiment, consists of a dielectric plastic material, within which are embedded spheres 33. The spheres must be made of a conducting material, while the dielectric medium must be non-conductive. Neither the dielectric nor the spheres can be formed of ferromagnetic material. In a preferred embodiment, the spheres are formed with a diameter of the order of 1.2 microns and preferably are formed of copper or aluminum. The spheres are dispersed throughout the dielectric bed at a distance of from 0.7 to 1 micron between their closest points.

Light incident on such a document will be scattered in a pattern which is dependent upon such variables as the wavelength of the incident light, the size of the individual spheres, the spacing of the individual spheres, the material from which the spheres are formed, and the color of the chosen dielectric. It has been found, for example, that more satisfactory results are achieved when the spheres are larger in diameter than the wavelength of incident light, and are spaced farther apart than such wavelength. Thus, light incident from the illuminating lamp of an electrostatic copier will be directed away from rather than toward the copier drum, preventing the successful copying of the original document. This is particularly true where, as is most common, a document consists of printed or typed letters, relatively small in size compared to the overall size of the document. A copy resistant original 30 may then be produced by printing or typing the information sought to be protected on original 30, comprising a paper substrate 31, coated with a dielectric plastic 32 in which are embedded conductive reflective spheres 33. Such an original would be readable in normal light, but would be non-reproducible on an electrostatic copier.

Use of diffusing elements is well-known in the field of optics for the purpose of resolving scattered or reflected light. A preferred embodiment of the above-described document utilizes a blue dielectric backing which enhances the scattering effect. The spacing and size of the spheres is dictated by the longest wavelength present in the visible light spectrum, namely, seven thousand angstroms. Generally speaking, as the size of the spheres is increased, the scattering effect is heightened; such considerations as the thickness of dielectric to be used and the difficulty of maintaining the spheres within the dielectric provide more realistic economic and functional parameters. It should be plain, however, that any such document construction may be tailored to the expected requirements of wavelength, intensity, size of print of other indicia, and other individual characteristics of the original sought to be protected. While use of aluminum and copper spheres have been preferred, it should also be noted that use of glass beads provides added light-scattering effect through internal reflection, diffraction and refraction.

Another document construction preferred for use with the subject copy control system depends for its efficacy upon obviating the reflection of light from the original to the copier. In effect, such an approach "blinds" the copier to the material printed on the document.

A preferred embodiment of the reflective copy-resistant document 49, as best illustrated in FIG. 3, features a paper substrate 50 to which a colored metalized sheet 51 is secured by adhesive 52. The metalized sheet may be a polystyrene, polyethylene or polyester. One such material used successfully is identified by the trademark Mirro Brite and is manufactured by Coating Products Incorporated, Division of Tyco Laboratories, Inc., located in Englewood Cliffs, N.J.

Copiers of various manufacture have equally various operating specifications in copy capabilities, particularly where original copies of varying colors are concerned. Apart from color copiers, which reproduce the colors of the original, black and white copiers have been found to respond to different colors with differing degrees of sensitivity. In most cases, colors are reproduced in gray tones. In one preferred embodiment, the metalized film is silver, which, in effect, acts as a mirror when placed upon the platen of a copier. The resulting copies turn out black and thus mask the type or print thereon. It has been found, however, that type or print placed on silver originals may be difficult to read. Although, various other metallic colors were considered and an additional preferred embodiment of the document utilizes a red metallic film, which results in a more easily readable original and enhances specular reflection. One such red film is identified as Coating Products Incorporated Red Number 104M; a satisfactory silver film has been found to be Coating Products Incorporated Silver Number 101M.

In a preferred method of manufacture, metallic film 51 includes a metalized layer 53 overlaid with a colored polyethylene of polyester or acetate layer 54. Such a construction facilitates the manufacture of documents of a desired specific color for desired specific uses. When used as a silver film document, acetate layer 54 is colorless and transparent.

Use of film document 49 as an original calls for some special techniques. Paper substrate 50 should be formulated to resist debossing when, for example, document 49 is used in typewriters or the like. Erasures of errors carry the danger of damaging either the acetate or film layers, and a special red foil correction tape may be used whereby the error may be struck over and thereafter typed correctly. To facilitate adhesion between common printing inks or typewriter ribbon inks, a silicone resin compound 55 may be applied to the surface of the document. One such material used successfully is a silicone resin spray manufactured by the Amway Corporation under the product designation E 47.

Adhesive layer 52 may, if desired, be formed of a translucent or transparent adhesive, and paper substrate 50 may have a pattern imprinted thereon, such as the word "void" repeated many times. In this way, any attempted erasure of the metallic film original will result in a portion of the metalized coating on film being removed, and will result in exposure of a portion of the pattern imprinted on substrate 50. This technique would make tampering readily identifiable on such a document.

In order to transfer the information onto a polished, specular surface without first placing any coating on the specular surface, a substrate carrying microencapsulated ink in a solvent base may be used. For example, the microencapsulation of ink in a solvent base is coated on one side of paper. The paper would overlay the specular surface on which the information is to be transferred. When the paper is typed upon, the underside capsules burst and the ink is transferred to the specular or polished surface while the solvent evaporates.

Although illustrative embodiments of the invention have been shown and described, it is to be understood that various modifications and substitutions may be made by those with skill in the art without departing from the novel spirit and scope of the present invention.

What is claimed is:

1. A copy-resistant document for precluding the unauthorized copying of said document on copying apparatus having light-producing elements and receiving elements for receiving light reflected from said document, said document comprising:
   a supporting substrate including a dielectric layer formed of an electrically non-conducting material;
   a plurality of generally spherical particles formed of an electrically conducting material embedded within said dielectric layer, said particles being operable to forwardly scatter light and divert the transmission of the reflected light away from said receiving elements, said particles being spherical and having a diameter of the order of 1.2 microns.

2. A copy-resistant document as described in claim 1, said particles being dispersed throughout the dielectric layer at a distance from 0.7 to 1 micron between their closest points.

3. A copy-resistant document for precluding the unauthorized copying of said document on copying apparatus having light-producing elements and receiving elements for receiving light reflected from said document, said document comprising:
   a supporting substrate including a dielectric layer formed of an electrically non-conducting material;
   a plurality of generally spherical particles formed of an electrically conducting material embedded within said dielectric layer, said particles being operable to forwardly scatter light and divert the transmission of the reflected light away from said receiving elements, said particles comprising spheres that are larger in diameter than the wavelength of incident light and spaced farther apart than said wavelength.

4. A copy-resistant document for precluding the unauthorized copying of said document on copying apparatus having light producing elements and receiving elements for receiving light reflected from said document, said document comprising:
   a supporting substrate including a dielectric layer formed of an electrically non-conducting thermoplastic material, said thermoplastic material being bonded to a supporting layer, said thermoplastic material embedding therewithin a plurality of generally spherical particles formed of an electrically conducting material, said spherical particles having a diameter of the order of 1.2 microns and being dispersed throughout the dielectric layer at a distance from 0.7 to 1 micron between their closest points, said particles being operable to forwardly scatter the light and disrupt the transmission of the reflected light to the receiving elements.

* * * * *